(12) United States Patent
Neft (10) Patent No.: US 8,504,995 B2
(45) Date of Patent: Aug. 6, 2013

(54) PROCESS FLOW ANALYSIS BASED ON PROCESSING ARTIFACTS

(75) Inventor: Mark Neft, Caldwell, NJ (US)

(73) Assignee: Accenture Global Services Limited, Dublin (IE)

( * ) Notice: Subject to any disclaimer, the term of this patent is extended or adjusted under 35 U.S.C. 154(b) by 1492 days.

(21) Appl. No.: 11/746,296

(22) Filed: May 9, 2007

(65) Prior Publication Data

US 2008/0282236 A1    Nov. 13, 2008

(51) Int. Cl.
*G06F 9/44* (2006.01)

(52) U.S. Cl.
USPC .......................................................... 717/130

(58) Field of Classification Search
USPC ................. 717/125, 128–131; 709/201, 223, 709/224; 714/47.2; 705/7, 64, 400
See application file for complete search history.

(56) References Cited

U.S. PATENT DOCUMENTS

| | | | |
|---|---|---|---|
| 6,108,700 A * | 8/2000 | Maccabee et al. ............ | 709/224 |
| 7,290,048 B1 * | 10/2007 | Barnett et al. ................. | 709/223 |
| 7,299,455 B2 | 11/2007 | Anderson et al. | |
| 7,640,337 B1 * | 12/2009 | Fultz et al. ..................... | 709/224 |
| 7,685,475 B2 * | 3/2010 | Barron et al. ................ | 714/47.2 |
| 7,805,509 B2 * | 9/2010 | Alon et al. ..................... | 709/224 |
| 7,886,281 B2 * | 2/2011 | Smith et al. .................... | 717/130 |
| 2003/0066055 A1 | 4/2003 | Spivey | |
| 2005/0138111 A1 * | 6/2005 | Aton et al. ..................... | 709/201 |
| 2007/0150322 A1 * | 6/2007 | Falchuk et al. ................... | 705/7 |
| 2007/0255980 A1 | 11/2007 | Endo | |

FOREIGN PATENT DOCUMENTS

| | | |
|---|---|---|
| EP | 1916804 A | 4/2008 |
| GB | 2374954 A | 10/2002 |
| WO | WO0072151 A | 11/2000 |

OTHER PUBLICATIONS

European Search Report issued Nov. 24, 2009 for Application No. 08251660.0-1225.
"Process Mining: Discovering Processes from Event Logs", Prof.dr. ir. Wil van der Aalst, Eindhoven University of Technology, Department of Information and Technology, Eindhoven, The Netherlands.
"Bangalore Tigers: The Rise of India's Tech Industry", Steve Hamm; Tech services research underway in Bangalore, Nov. 28, 2006; Business Week online, http: www.businessweek.com/globalbiz/blog/bangaloretigers/archives/2006/11.

* cited by examiner

*Primary Examiner* — Tuan A Vu

(74) *Attorney, Agent, or Firm* — Harrity & Harrity, LLP (57) ABSTRACT

A plurality of reporting elements are applied to a process, which reporting elements, during operation of the process, generate processing artifacts each including a coordination identification (relative to a specific item flowing through the process), a service identification and a time stamp. Thereafter, flow of the item through the process may be analyzed based on the processing artifacts. The processing artifacts may be stored locally at each reporting element or centrally. In the presently preferred embodiment, the analysis of the flow of an item through the process includes generating an industry-standard representation of the flow based on the processing artifacts. In this manner, the present invention provides for a complete analysis of a given process, particularly business processes, through the collection of relatively simple, easily-generated processing artifacts.

24 Claims, 7 Drawing Sheets

PROCESS FLOW ANALYSIS BASED ON PROCESSING ARTIFACTS

FIELD OF THE INVENTION

The present invention relates generally to the analysis of processes and, in particular, to analysis techniques based on the use of processing artifacts generated by a plurality of reporting elements deployed within a process.

BACKGROUND OF THE INVENTION

Businesses in today's global economy are increasingly called upon to implement relatively complex processing systems in order to efficiently and accurately manage increasing amounts of data and information, from both internal and external sources, using constantly-evolving information technology (IT) infrastructure. Some IT systems become so complex that it becomes difficult, at best, to determine how or how well business processes are being implemented. As a result, it is similarly difficult to determine if such IT systems are properly aligned with the needs of the business. These problems are exacerbated where heterogeneous systems (i.e., systems from different vendors and/or not designed to operate together) are linked together, e.g., human resource information systems communicating with separate accounting payroll systems.

Figure 1:
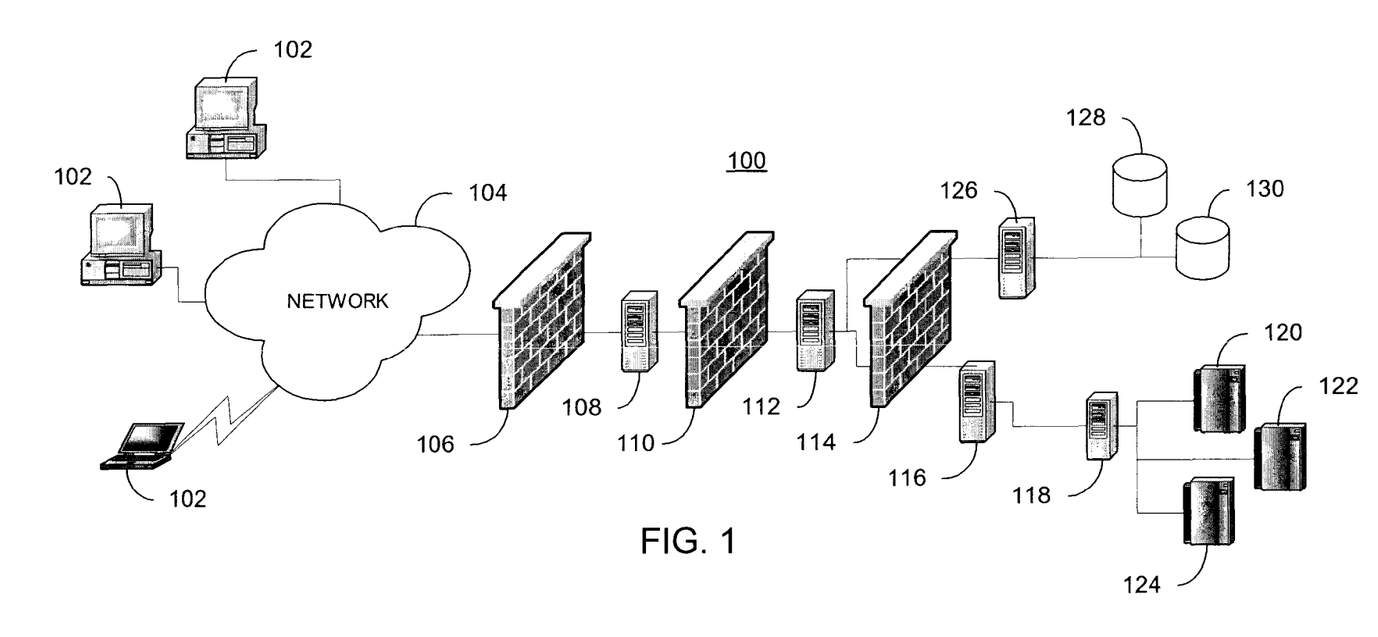
FIG. 1 is a block diagram illustrating a typical prior art processing system.

An example of this is illustrated in FIG. 1 where a fairly typical system 100 is illustrated. In particular, the system 100 comprises a plurality of remote users 102, often using client software, communicating with a typical business IT system 103 via a network 104. As shown, the IT system 103 comprises a proxy server 108 sitting behind a first firewall 106, and a web server 112 sitting behind a second firewall 110. Various application servers 116, 126, sitting behind yet another firewall 114, communicate with proprietary databases 128, 130, or with various legacy systems 120-124 through appropriate interface software 118. Given that each of the computing devices illustrated in FIG. 1 (i.e., user 102 devices; firewalls 106, 110, 114; servers 108, 112, 116, 126; databases 128, 130; interface software 118; legacy systems 120-124) may comprise one or more software applications involved in processing data within the IT system 103, it becomes remarkably complex to determine exactly how any given piece of data is processed, much less whether such processing is being carried out in an optimal manner. Although the examples described hereinabove have been restricted to business IT systems, those of skill in the art will appreciate that the problem of IT system complexity and the attendant difficulties in analyzing them are not restricted to the domain of business, and in fact may be found in a variety of entities/organizations.

Prior art techniques have failed to adequately address the need to develop understanding of deployed (i.e., installed and operational) processes, sometime referred to as "process discovery", particularly in any sort of automated fashion. A commonly employed technique currently is to manually reverse engineer each component of a business process, particularly those that are implemented using software applications. Where software is used, this may require analysts to review source code, if available, or reconstruct such source code to understand the particular functions implemented by the software application. Not surprisingly, this is a time-consuming and expensive process that is prone to error.

So-called Application Response Measurement (ARM) techniques have been developed that allow analysts to measure the performance (i.e., response time) of deployed software applications. Using these techniques and corresponding suites of tools, analysts are able to determine how quickly data is processed, but are unable to develop any understanding of how the software under test is particularly implemented, i.e., the internal configuration of the software. As a result, it may be difficult, if not impossible, to determine whether the process under consideration is sub-optimal in any fashion.

More recently, researchers at Eindhoven University of Technology have developed techniques for so-called "process mining" in order to develop models of existing processes. In particular, process logs are developed by obtaining couplets consisting of "case identifications" (i.e., identifications of particular data elements being processed) and corresponding "task identifications" (i.e., identifications of particular portions of the overall process operating upon a given data element) reported by a process. By analyzing such processing logs, sequences of tasks that have been purposefully instrumented (i.e., modified to report the desired couplet information) can be identified. However, the value of this technique necessarily depends on the ability of the test designers to correctly identify the appropriate tasks for instrumentation. As it is currently understood, it does not appear that this technique has the capability to discover parent/child processes that have not already been identified during the instrumentation phase.

Thus, a need exists for techniques that allow for the analysis of process flows, preferably in an automated manner, that overcome the limitations of prior art techniques.

SUMMARY OF THE INVENTION

The present invention provides various techniques for analyzing flow of an item through a process. To this end, the plurality of reporting elements are applied to the process, which reporting elements, during operation of the process, generate processing artifacts each including a coordination identification that is substantially unique to an item being processed, a service identification that is substantially unique to a portion of the process to which the reporting element is applied, and a time stamp. Thereafter, flow of the item through the process may be analyzed based on the processing artifacts obtained in this manner. While this technique may be applied to virtually any type of process, the present invention is particularly beneficial in those instances in which the process is embodied in software. In various embodiments of the present invention, the processing artifacts may be stored locally at each reporting element, or they may be provided to non-local, even centralized, storage devices. In the presently preferred embodiment, the analysis of the flow of an item through the process includes generating a representation of the flow based on the processing artifacts. As known in the art, such representation of the flow through the process may include, but is not limited to, a process flow diagram, a sequence diagram, a swim lane diagram, etc. In this manner, the present invention provides for a complete analysis of a given process, particularly business processes, through the collection of relatively simple, easily-generated processing artifacts.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION OF THE PRESENT EMBODIMENTS

Figure 2:
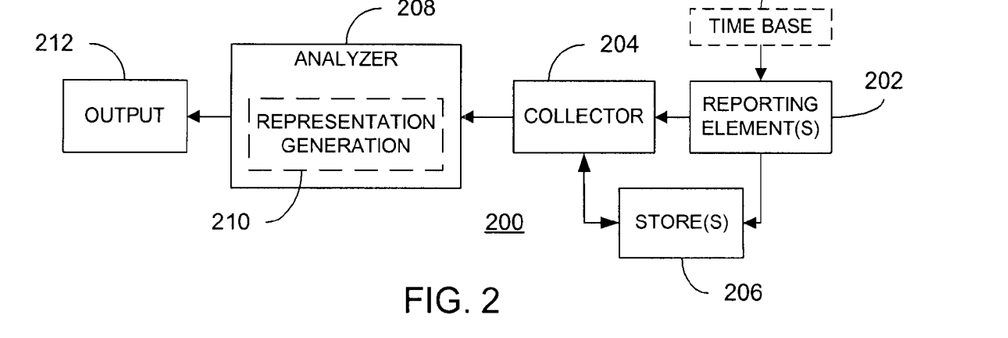
FIG. 2 is block diagram of a system for analyzing a process in accordance with an embodiment of the present invention.

Referring now to FIG. 2, an implementation of a system 200 in accordance with the present invention is illustrated. The system 200 may be applied to virtually any process. As used herein, a process may be any combination of activities, whether performed automatically (i.e., software), semi-automatically (e.g., computer-assisted, user-initiated), manually (e.g., paper-based) or any combination thereof, within a system, e.g. an enterprises information processing system, or one or more subsets of such systems, etc. In particular, the system 200 is beneficial in determining the flow of an item through such processes. An item in accordance with the present invention is the object, data, etc. being worked on by the process, e.g., a customer transaction, a service call, a package being delivered, etc. Those having ordinary skill in the art will appreciate that the present invention can be applied to a wide variety of processes when tracking any of a number of items through such processes.

Referring once again to FIG. 2, the system 200 comprises a plurality of reporting elements 202 in communication with a processing artifact collector 204. The collector 204 is in communication with an analyzer 208 that, in turn, provides output (e.g., a representation of a flow of the process) to an output device 212. In accordance with an embodiment of the present invention, the analyzer 208 comprises a representation generation component 210 as shown. As further shown, the reporting elements 202 communicate with one or more stores 206 that are also in communication with the collector 204. Additionally, a time-base component 201 is also provided in communication with the reporting elements 202.

As described in further detail below, each of the reporting elements 202 may take virtually any form depending on the nature of the process or that part of the process to which it is applied. For example, where the process under consideration is implemented entirely in software, each corresponding reporting element is likewise implemented as a software routine. However, it will be appreciated by those having ordinary skill in the art, such reporting elements may be equally applied to processes that are implemented manually or in some other fashion. For example, where the process is completely manual in nature, each report element may be embodied by report form or the like that is filled out by an analyst. Further description of the preferred embodiment of each reporting element is further illustrated in FIG. 5 described below.

As shown, each reporting elements 202 is coupled to a time-base component 201 that provides an "universal" time-base across the entire process. This is provided such that the time stamps generated by the reporting elements (described in further detail below) are consistent with respect to one another thereby establishing a reliable basis for establishing the ordering inherent to the process under consideration. The particular implementation of the time-base component 201 depends in part upon the nature of the process being considered. For example, where the process is implemented in a single computer, the time-base component 201 may be derived directly from a clock or other timing elements forming a part of the computer. Alternatively, where the process under consideration is more heterogeneous in nature, the time-base component 201 may comprise a plurality of synchronized clocks or other timing elements. Those having skill in the art will appreciate that any of a number of implementation techniques may be employed for this purpose.

Each of the reporting elements 202 provides a coordination identification that is a substantially unique identification for an item being processing at any given moment in time by that portion of the process to which the reporting element has been applied. The format of, and various techniques for generating, such coordination identifications are known in the art. For example, in one embodiment of the present invention, the coordination identification is derived from the item itself using, for example, a hash function applied to data that is inherent to or representative of the item being processed. Alternatively, the item under consideration may by its nature have unique characteristics that may serve this purpose, e.g., an account identification, a user identification, serial number, Social Security Number, etc.

In addition to the coordination identification, each reporting element 202 also provides a service identification that identifies that portion of the process to which the time reporting element has been deployed. Once again, various techniques for deriving and representing such service identifications are well known to those having skill in the art. For example, as illustrated in greater detail below, where the process under consideration comprises a software-based process, such service identifications may correspond to names given to various programs or sub-programs of such process. In accordance with alternative embodiments of the present invention, each reporting element 202 may provide corresponding processing artifacts to either the collector 204 directly or, in an alternative embodiment, to the store 206.

In accordance with alternate embodiments of the present invention, the processing artifacts may be provided directly to the analyzer 208 for real time or near real-time analysis or, in a presently preferred embodiment, stored in one or more suitable storage devices such as the at least one storage device 206 illustrated in FIG. 2. Where such storage devices 206 are used, they may be arranged in either a distributed or centralized fashion. In the former, for example, one or more of the reporting elements 202 has access to a local storage device (e.g., computer memory where the process is implemented across multiple computer platforms) and stores processing artifacts therein. In a centralized arrangement, the storages device(s) is(are) maintained at one or more locations remote to each reporting element 202. Further still, a combined distributed and centralized arrangement may be employed as dictated, for example, by the nature of the environment within which each reporting element 202 must reside. Regardless of the specific implementation, in a stored processing artifacts embodiment, the collector 204 is in communication with such stores 206.

The collector 204 operates to acquire the various processing artifacts from the reporting elements 202, either directly or from the one or more storage devices 206, and thereafter provides them to the analyzer 208. Once again, the collector 204 may be implemented in a distributed or centralized fashion. For example, where the stores 206 are localized to one or more of the reporting elements 202, the collector 204 may likewise be implemented as adjuncts to the reporting elements 202 that periodically gathers the processing artifacts and provides them to the analyzer 208. Alternatively, the collector 204 may be implemented on a centralized platform, e.g., a server computer, and operate to acquire the processing artifacts (via, for example, an appropriate request sent to, or asynchronously received from, the reporting elements 202) on an as-needed, periodic, etc. basis. Those having ordinary skill in the art will appreciate that a variety of such implementations are possible as a matter of design choice.

The analyzer 208 operates upon the received processing artifacts to analyze flow of specific items through the process under consideration. The analyzer 208 as well as the collector 204 may be implemented using executable instructions being executed by one or more suitable processing devices, i.e., appropriately-programmed processing devices, as described below, although other implementations will be apparent to those of skill in the art. In a presently preferred embodiment, the analyzer 208 operates to generate a representation of a flow of one or more items through a process using, for example, a representation generation component 210 (the operation of which is described in further detail below) based on the processing artifacts. In this embodiment, the representation is thereafter provided by the analyzer to the output component 212 that, in turn, provides a visual depiction of the representation of the flow. For example, the output component 212 may comprise any device capable of rendering the flow representation in a visual form, such as a computer monitor, a printer, interface, etc. or any other display device as known in the art. The particular format of the representation of the flow may be adjusted according to the specific implementation of the output component 212 employed.

The analyzer 208 may also operate to analyze the received processing artifacts using techniques other than representation generation. For example, as will be appreciated by those of skill in the art, the processing artifacts could equally be used for ARM processing. Alternatively, the processing artifacts may be used for assessing test coverage, process optimization, identification of critical processing functions, etc. or other analysis functions known to those of skill in the art.

Figure 3:
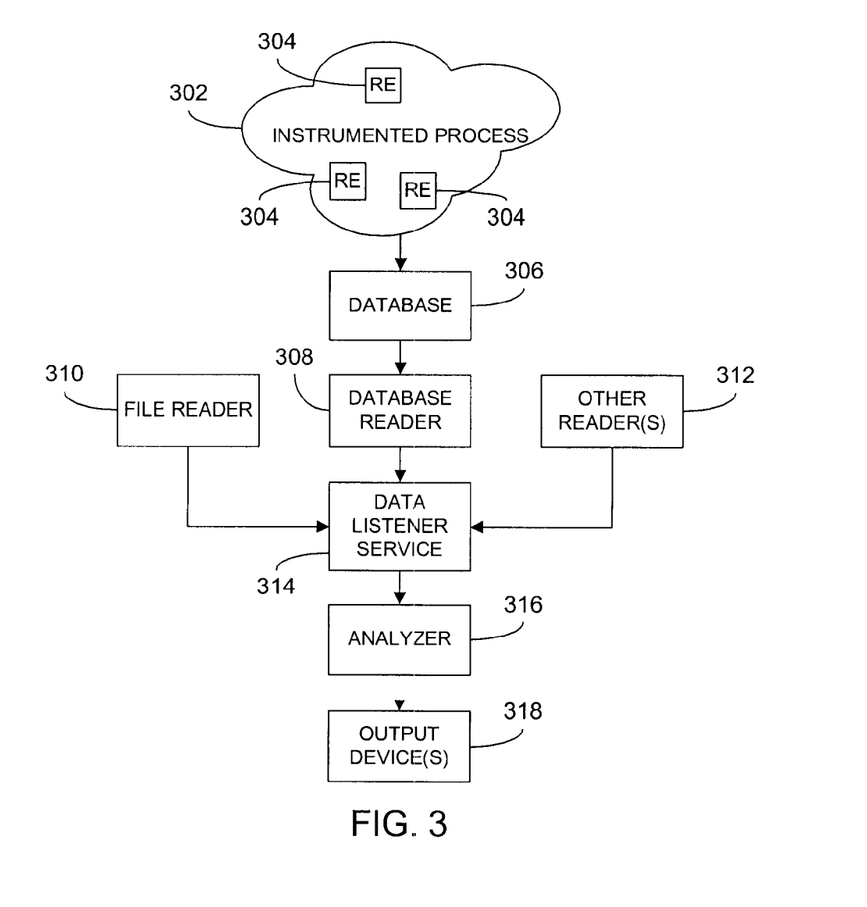
FIG. 3 is a block diagram of a system for analyzing a process in accordance with another embodiment of the present invention.

Referring now to FIG. 3, a particular implementation of the system 200 of FIG. 2 is further illustrated. As shown, an instrumented process 302 has deployed therein various reporting elements 304 as described above. Although three reporting elements are illustrated in FIG. 3, those having ordinary skill in the art will appreciate that a greater or lesser number of reporting elements may be equally employed as a matter of design choice. Each of the reporting elements 304, in turn, communicates with a database 306 that may be implemented using known techniques. In particular, the database 306 stores the processing artifacts provided by the reporting elements for subsequent analysis by an analyzer 316. In conjunction with the database 306, a database reader 308 is provided that may be implemented using known database management software executing on a suitable computing platform. In parallel with the database reader 308, a file reader 310 or other reader(s) 312 may also be provided. The file reader 310 and/or other reader(s) 312, which may be implemented using known techniques, extend the ability to collect processing artifacts from any source that may supply such artifacts and to allow the collection of processing artifacts that may not otherwise be readily provided to the database 306. A data listener service 314 is able to obtain processing artifacts from any of a number of sources that may be used to provide input data to an analyzer 316 as described above. For example, in one embodiment, the data listener service 314, using known implementation techniques, allows clients (i.e., the various readers 308-312) to "push" data to the analyzer 316, substantially in real-time. Collectively, the various readers 308-312 and the data listening service 314 embody the functionality of the collector 204 described above. As shown, the analyzer 316 receives processing artifacts from the data listener service 314 and, as described above, provides one or more representations of flow of items through the instrumented process 302 to one or more output devices 318, as described above.

Figure 4:
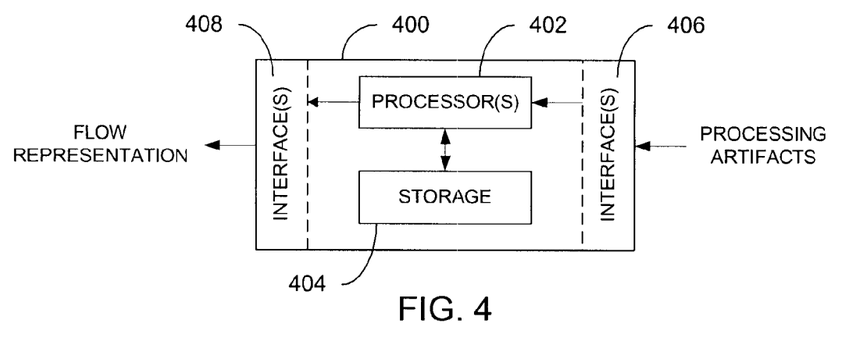
FIG. 4 is a block diagram illustrating an exemplary implementation of an analyzer in accordance with an embodiment of the present invention.

Referring now to FIG. 4, a suitable processing device 400 for implementing the analyzer 208 (as well as, possibly, the collector 204) in accordance with one embodiment of the present invention is further illustrated. In particular, the device 400 comprises one or more processing devices 400 in communication with one or more storage devices 404. The one or more processors 402 may include microprocessors, microcontrollers, digital signal processors, co-processors such as graphics co-processors, similar devices or combinations thereof, as know in the art. Similarly, the storage devices 404 may comprise any suitable volatile or non-volatile memory devices such as random access memory (RAM) and/or read only memory (ROM) as known to those having skill in the art. As further shown, the one or more processors 402 are also in communication with one or more input interfaces 406 as well as one or more output interfaces 408. The input interfaces 406 are operative to receive processing artifacts from any of the variety of sources described above. As such, the input interfaces 406 may be implemented using any combination of hardware, firmware, or software as known in the art. Similarly, the output interface(s) is(are) operative to provide an output of the analyzer (e.g., a flow representation, as shown) to a suitable output device. Once again, techniques for implementing the output interface(s) 408 are well known to those having skill in the art. With these basic components, the processing device 400 may take any of a number of different forms, such as a desktop or laptop computer, a server computer, a handheld or other mobile device such as a mobile phone, personal digital assistant, etc. The present invention is not limited in this regard.

Figure 5:
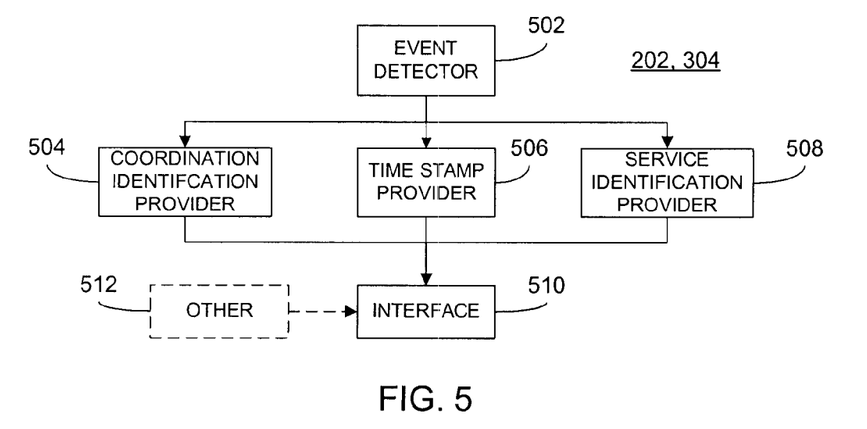
FIG. 5 is a block diagram illustrating an exemplary implementation of a reporting element in accordance with an embodiment of the present invention.

Referring now to FIG. 5, an implementation of a reporting element 304 is further illustrated. Although a particular schema is illustrated in FIG. 5, the specific implementation of the reporting element 304 is necessarily dependent upon the nature of the process (or that portion of the process) to which it is applied. In a presently preferred embodiment, each of the components 502-512 is implemented using known software programming techniques although other implementations are possible. Regardless, an event detector 502 is provided that serves to detect the occurrence of specific events relevant to an item being processed by that portion of the process in which the reporting element 202, 304 is deployed. For example, where the instrumented process is a software program or series of software programs, the event detector may be implemented as instructions designed to signal the entrance/exit or call/return of a given program, subprogram, etc. Alternatively, where the process under consideration is a substantially manual process, a relatively simple implementation such as a manual event log or similar mechanism indicating that certain portions of a process have been completed may be used. The specific nature of the events detected by the event detector 502 once again depends on the nature of the instrumented process.

Regardless of the specific implementation of the event detector 502, an indication of the detected event is provided as input to a coordination identification provider 504, the time stamp provider 506 and a service identification provider 508, as shown. The various components 504-508 illustrated in FIG. 5 are operative to provide the various constituents of the processing artifacts described above, i.e., the coordination identification, time stamp, and service identification, respectively. In particular, the coordination identification provider 504 generates a coordination identification in response to the event detection indication provided by the event detector 502. Likewise, the time stamp provider 506 provides a time stamp (derived from the time base 201) in response to the detected event and the service identification provider 508 provides a service identification, again in response to such event information. It is noted that the granularity (i.e., minimum resolution) of the time stamps depends on the nature of the process being analyzed. For example, a computer-implemented process may need to resolve time stamps down to a millisecond or even microsecond level, whereas manual processes might be best measured in minute-long intervals. As a general, but not immutable, rule, higher resolutions (potentially resulting in more data points) are preferred.

The outputs of various components 504-508 are provided to an interface component 510 where they are assembled into a processing artifact for later provision to a suitable analyzer. As shown, the interface 510 may be in communication with various other sources 512 of relevant information that may be beneficially applied to the creation of processing artifacts, although it is generally preferred to keep the amount of data within a processing artifact to a minimum. For example, such additional data/information may include server numbers and/or addresses, Internet Protocol (IP) addresses, or any other data/information useful to analysts of the process under consideration.

Figure 6:
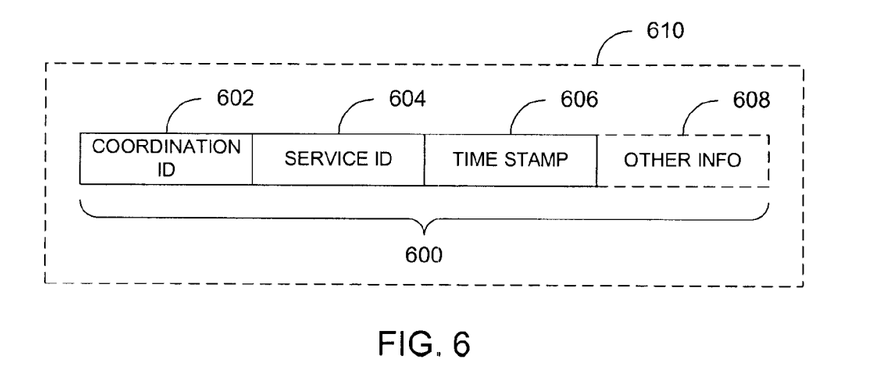
FIG. 6 illustrates an exemplary schema of processing artifacts in accordance with an embodiment of the present invention.

An exemplary schema of a processing artifact 600, stored on a suitable machine-readable medium 610 (such as a magnetic or optical disk or other storage device known to those having ordinary skill in the art) is further illustrated in FIG. 6. As shown, the processing artifact comprises a coordination identification 602, a service identification 604, a time stamp 606 and, optionally, other information 608. It is noted that, although a single processing artifact 600 is illustrated in FIG. 6, those having skill in the art will appreciate that a multitude of processing artifacts in accordance with the illustrated schema may be stored on the medium 610. Furthermore, although the various components 602-608 are arranged in a particular order in the illustrated schema, such ordering may be a matter of design choice and any suitable order may be employed.

Figure 7:
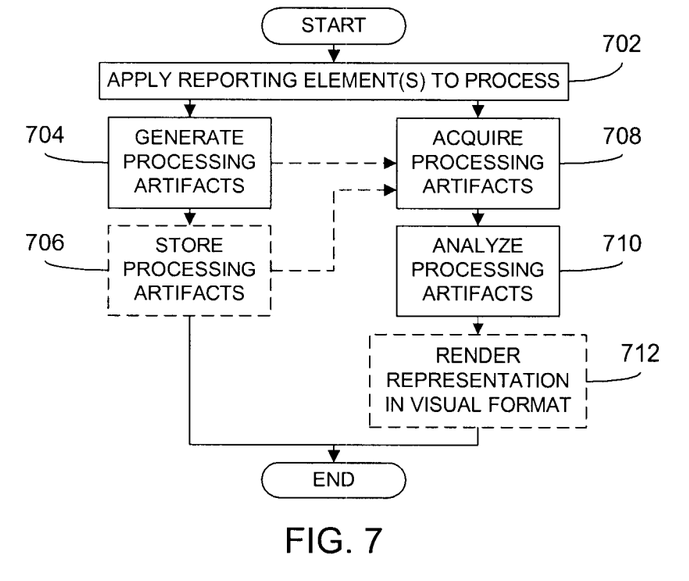
FIG. 7 is a flowchart illustrating analysis of a process in accordance with an embodiment of the present invention.

Referring now to FIG. 7, processing in accordance with an embodiment of the present invention is further illustrated. In a presently preferred embodiment, the processing illustrated in FIG. 7 is implemented using executable instructions carried out by one or more suitable processors, as described above. However, it is understood that other implementations may be equally employed, for example, a hardware-based implementation using application specific circuits (ASICs), programmable logic arrays, etc. may be equally employed. Regardless, processing begins at block 702 where one or more reporting elements are applied to the process, i.e., the process is instrumented. Such "instrumentation" may be either obtrusive (requiring modification, other than the addition of the reporting elements, of the pre-existing implementation of the process) or non-obtrusive (not requiring such modifications), depending on the nature of process being analyzed. For example, where the process under consideration is implemented as software, the reporting elements may be applied as relatively small programs that are inserted at appropriate points with the source code or object code of the process software. Regardless of how the instrumentation is completed, processing may proceed along two parallel paths as shown. Along a first path, processing begins at block 704 where the reporting elements generate processing artifacts as described above. Thereafter, if the resulting processing artifacts are not provided in real-time to an analyzer (as illustrated by the dotted line exiting block 704), processing continues at block 706 where the processing artifacts are stored locally or centrally as also described above.

In parallel, at block 708, processing artifacts generated by the previously applied reporting elements are acquired by an analyzer as described above (i.e., directly from the reporting elements, or from local/central storage devices). Thereafter, at block 710, flow of the process thus instrumented is analyzed based on the processing artifacts. As noted above, the analysis of the process performed by the analyzer, in a presently preferred embodiment, includes generating a representation of the process flow. The representation of the process flow may be any one or more of a number of industry-standard process representation formats including, but not limited to, a process flow diagram, a sequence diagram and/or a swim lane diagram. Techniques for generating such diagrams (including display data representative thereof) are well know in the art. Using such techniques, transformation of the processing artifacts into a form suitable for display is based on mathematical placement of the visual indicators (e.g., icons) representative of various instrumented portions of the process based on the type of visual image desired. Tables 1-3 below illustrated exemplary pseudo-code that may be used to generate various industry-standard diagrams.

TABLE 1

Simple Process Flow (No Parallel Processing) Diagram
Y = Constant
X = X+1 for every service call
Sort processing artifacts by coordination identification, time stamp
While not done
    Draw at X, Y Service name
    X = X+1
End loop

TABLE 2

Sequence Diagram
AS[ ]= Array Services
AS[i]= unique service identifications sorted by time stamp
X axis = the set of unique services
Y axis = time
For all processing artifacts
While not done
    Draw connection arrow from last AS to AS[index(artifact service name)], Y
    Y = Y+1
End loop

TABLE 3

Swim lane Diagram
Swim lane diagrams require an additional reference table that maps a service to a lane
X axis = Lanes (one for each instrumented process portion)
Y axis = relative time
For all processing artifacts
While not done
    Draw services at Lanes(index on service name), Y
    Y = Y+1
End loop Those having skill in the art will appreciate that other, similar techniques may be equally employed for this purpose. Regardless of how they are generated, the resulting representations of the flow of the process is subsequently rendered into a visual format, as illustrated at block 712.

Figure 8:
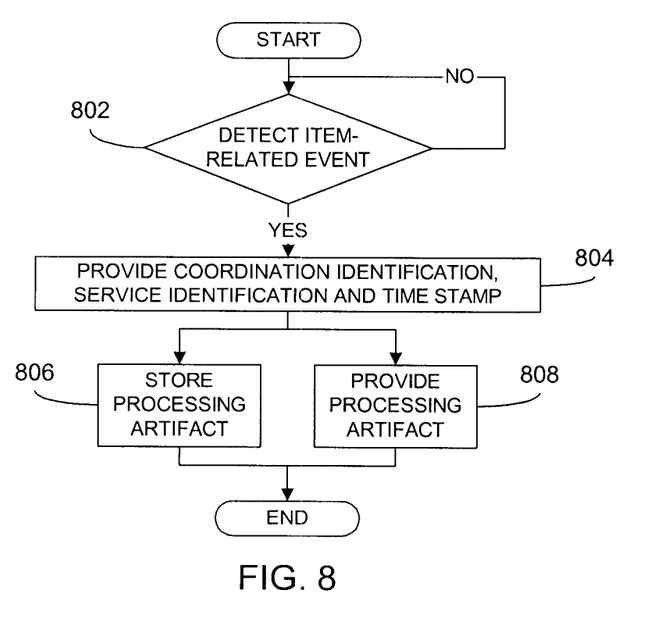
FIG. 8 is a flowchart further illustrating operation of a reporting element in accordance with an embodiment of the present invention.

Referring now to FIG. 8, operation of the reporting elements in accordance with an embodiment of the present invention is further illustrated. Thus, beginning at block 802, it is determined whether an event, as defined relative to that portion of the process to which the reporting element has been applied, is detected. When the relevant event(s) is(are) detected, processing continues at block 804 where the recording element provides the coordination identification, service identification and time stamp (and optionally, the additional information) in response. Thereafter, at blocks 806 or 808, alternative paths may be taken. In particular, at block 806 the processing artifacts may be stored in any suitable storage device as described above. Once again, such storage may be local to the reporting elements or within a centralized storage device. Alternatively, at block 808, the processing artifact may be directly provided to the analyzer.

Figure 9:
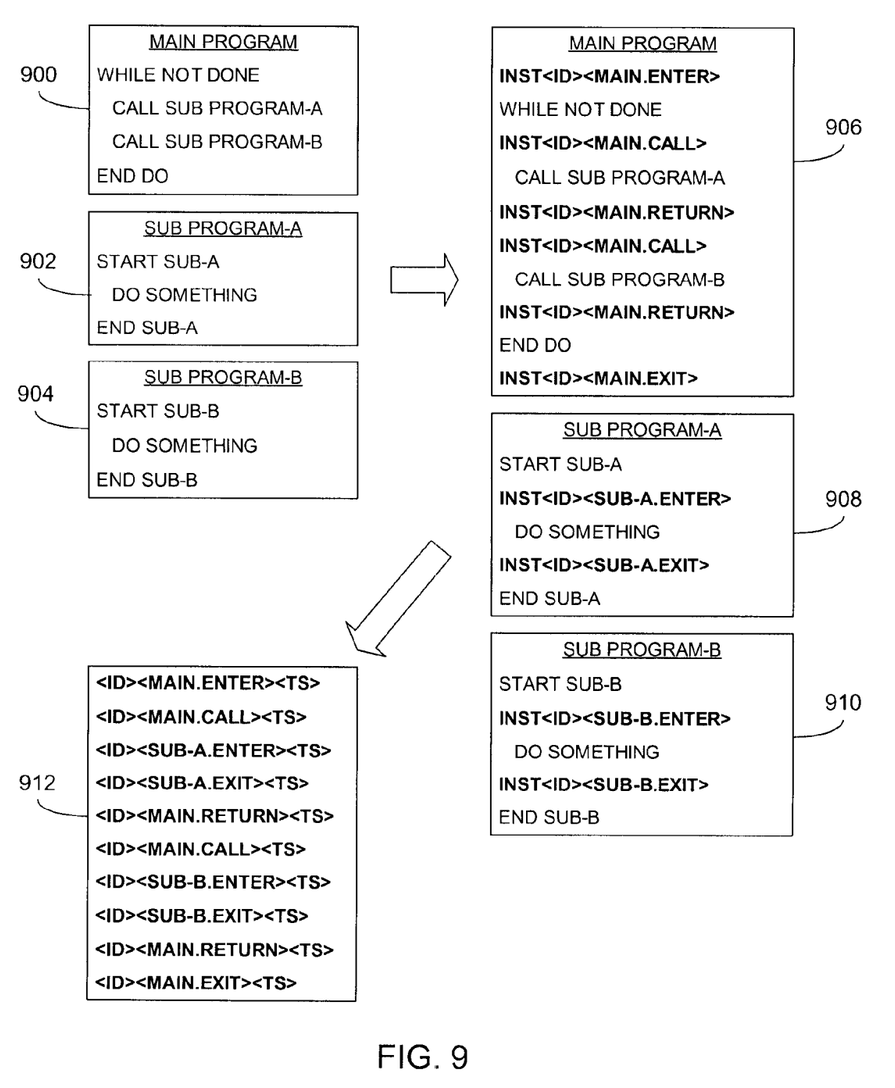
FIG. 9 is an illustration of instrumentation of an exemplary software program comprising various subprograms and resulting processing artifacts in accordance with an embodiment of the present invention.
Figure 10:
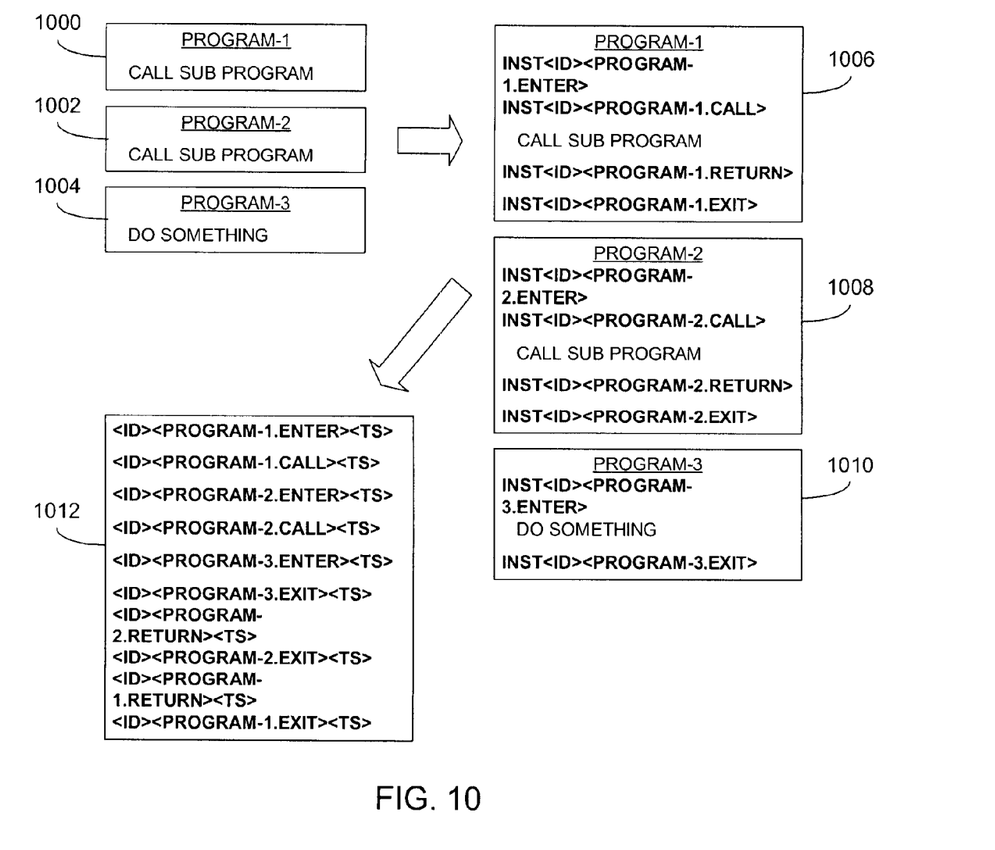
FIG. 10 is an illustration of instrumentation of an exemplary process comprising multiple software programs and resulting processing artifacts in accordance with an embodiment of the present invention.
Figure 11:
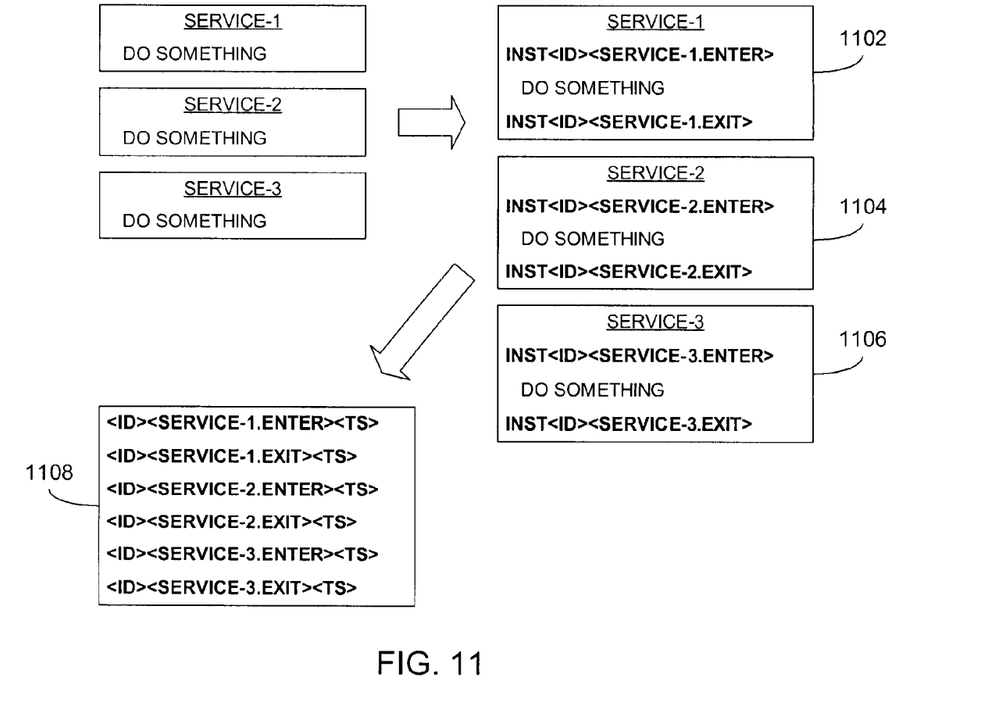
FIG. 11 is an illustration of instrumentation of an exemplary collection of heterogeneous processes and resulting processing artifacts in accordance with an embodiment of the present invention.

FIGS. 9-11 illustrate exemplary instrumentation of a single program 900 comprising multiple sub-programs 902, 904. In accordance with the above, the exemplary instrumentation comprises small sequences of instructions (illustrated in bold type) placed before and after call/return points and entry/exit points between the main program 900 and the various sub-programs 902, 904. Although illustrated both before and after such call/return and entry/exit points, it will be appreciated that such instrumentation may be placed only before or only after such points, or in conjunction with such points only within the main program (call/return) or only within the sub-programs (entry/exit). When the resulting instrumented programs 906-910 are executed, a processing artifacts log 912 results. As such, the various processing artifacts include the coordination identifications ("<ID>"), service identifications and time stamps ("<TS>") as described above.

In a similar vein, as shown in FIG. 10, instrumentation of an application made of many programs 1000-1004 is shown. Once again, the various reporting elements are placed at call/return and entry/exit points within each program to provide the instrumented programs 1006-1010. The resulting processing artifact log 1012 demonstrates the same types of processing artifacts described above. Yet another example is illustrated in FIG. 11, where a process consisting of multiple, heterogeneous services (Service-1, Service-2, Service-3; assuming an overlying orchestration layer between the multiple services) is shown. Once again, the instrumented services 1102-1106 include the necessary reporting elements, as shown, resulting in a processing artifacts log 1108.

As described above, the present invention provides a technique for analyzing process flows. This is achieved by instrumenting processes to be analyzed with appropriate reporting elements. When activated (i.e., when a triggering event is detected), each reporting element generates a processing artifact comprising, at a minimum, a coordination identification, a service identification and a time stamp, as described above. Based on such processing artifacts, the present invention enables the rapid development of suitable representations of process flows that may be displayed as needed. For at least these reasons, the present invention represents an advancement over prior art techniques.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

What is claimed is:

1. A method comprising:
   generating, by at least one processing device, instructions for a program, instructions for a first sub-program, and instructions for a second sub-program,
     the program being to call the first sub-program based on an occurrence of a first service of a process of an item,
     the program being to call the second sub-program based on an occurrence of a second service of the process of the item,
     the program including code associated with a plurality of entry points and code associated with a plurality of exit points,
       a first entry point, of the plurality of entry points, being associated with the first service,
       a first exit point, of the plurality of exit points, being associated with the first service,
       a second entry point, of the plurality of entry points, being associated with the second service,
       a second exit point, of the plurality of exit points, being associated with the second service,
       each of the plurality of entry points being different than each of the plurality of exit points,
   applying, by the at least one processing device and based on execution of the generated instructions for the program, execution of the generated instructions for the first sub-program, and execution of the generated instructions for the second sub-program, a plurality of reporting elements to the first service of the process,
     a first reporting element, of the plurality of reporting elements, being applied at the first entry point, and
     a second reporting element, of the plurality of reporting elements, being applied at the first exit point;
   applying, by the at least one processing device and based on execution of the generated instructions for the program, execution of the generated instructions for the first sub-program, and execution of the generated instructions for the second sub-program, a plurality of other reporting elements to the second service of the process, the second service being heterogeneous from the first service,
a third reporting element, of the plurality of other reporting elements, being applied at the second entry point, and
a fourth reporting element, of the plurality of other reporting elements, being applied at the second exit point;
generating, by the at least one processing device and based on the first reporting element, the second reporting element, the third reporting element, and the fourth reporting element, first processing artifacts and second processing artifacts,
the first processing artifacts and second processing artifacts each comprising:
a coordination identification that is substantially unique to the item,
a service identification that is substantially unique to a portion of the process to which the reporting element is applied, and
a time stamp; and
analyzing, by the at least one processing device, a flow of the item through the process based on the first processing artifacts and the second processing artifacts by examining a representation of the flow of the item through the process,
the representation being based on a transformation of the first processing artifacts and the second processing artifacts to include a plurality of icons associated with the flow of the item through the process.

2. The method of claim 1, further comprising:
storing the first processing artifacts with the second processing artifacts,
where, when analyzing the flow of the item, the method includes:
accessing the stored first processing artifacts and the second processing artifacts to analyze the flow.

3. The method of claim 1, further comprising:
storing the first processing artifacts and the second processing artifacts in a log of processing artifacts,
where, when analyzing the flow of the item, the method includes:
using the log of processing artifacts to analyze the flow.

4. The method of claim 1,
where the representation is a sequence diagram illustrating the plurality of icons associated with the flow of the item through the process.

5. The method of claim 1, further comprising:
storing the first processing artifacts and the second processing artifacts prior to analyzing the flow of the item.

6. The method of claim 1, further comprising:
analyzing the flow of the item prior to storing the first processing artifacts and the second processing artifacts; and
storing the first processing artifacts and the second processing artifacts after analyzing the flow of the item.

7. The method of claim 1, further comprising:
generating instructions for a third sub-program;
applying, based on execution of the generated instructions for the third sub-program, one or more additional reporting elements to a third service of the process;
generating, based on the one or more additional reporting elements, third processing artifacts; and
storing the third processing artifacts for analysis.

8. The method of claim 7, further comprising:
analyzing the flow of the item through the process further based on the third processing artifacts.

9. An apparatus comprising:
a memory to store instructions; and
a processor to execute the instructions to:
generate instructions for a program, instructions for a first sub-program, and instructions for a second sub-program,
the program being to call the first sub-program based on an occurrence of a first service of a process of an item,
the program being to call the second sub-program based on an occurrence of a second service of the process of the item,
the program including code associated with a plurality of entry points and code associated with a plurality of exit points,
a first entry point, of the plurality of entry points, being associated with the first service,
a first exit point, of the plurality of exit points, being associated with the first service,
a second entry point, of the plurality of entry points, being associated with the second service,
a second exit point, of the plurality of exit points, being associated with the second service,
each of the plurality of entry points being different than each of the plurality of exit points,
apply, based on execution of the generated instructions for the program, execution of the generated instructions for the first sub-program, and execution of the generated instructions for the second sub-program, a plurality of reporting elements to the first service of the process,
a first reporting element, of the plurality of reporting elements, being applied at the first entry point, and
a second reporting element, of the plurality of reporting elements, being applied at the first exit point;
apply, based on execution of the generated instructions for the program, execution of the generated instructions for the first sub-program, and execution of the generated instructions for the second sub-program, a plurality of other reporting elements to the second service of the process,
the second service being heterogeneous from the first service,
a third reporting element, of the plurality of other reporting elements, being applied at the second entry point, and
a fourth reporting element, of the plurality of other reporting elements, being applied at the second exit point;
generate, based on the first reporting element, the second reporting element, the third reporting element, and the fourth reporting element, first processing artifacts and second processing artifacts,
the first processing artifacts and second processing artifacts each comprising:
a coordination identification that is substantially unique to the item,
a service identification that is substantially unique to a portion of the process to which the reporting element is applied, and
a time stamp; and
analyze a flow of the item through the process based on the first processing artifacts and the second processing artifacts by examining a representation of the flow of the item through the process, the representation being based on a transformation of the first processing artifacts and the second processing artifacts to include a plurality of icons associated with the flow of the item through the process.

10. The apparatus of claim 9, where the processor is further to:
store the first processing artifacts with the second processing artifacts,
where, when analyzing the flow of the item, the processor is further to:
access the stored first processing artifacts and the second processing artifacts to analyze the flow.

11. The apparatus of claim 9, where the processor is further to:
store the first processing artifacts and the second processing artifacts in a log of processing artifacts,
where, when analyzing the flow of the item, the processor is further to:
use the log of processing artifacts to analyze the flow.

12. The apparatus of claim 9, where the representation is a sequence diagram illustrating the plurality of icons associated with the flow of the item through the process.

13. The apparatus of claim 9, where the processor is further to:
store the first processing artifacts and the second processing artifacts prior to analyzing the flow of the item.

14. The apparatus of claim 9, where the processor is further to:
analyze the flow of the item prior to storing the first processing artifacts and the second processing artifacts; and
store the first processing artifacts and the second processing artifacts after analyzing the flow of the item.

15. The apparatus of claim 9, where the processor is further to:
generate instructions for a third sub-program;
apply, based on execution of the generated instructions for the third sub-program, one or more additional reporting elements to a third service of the process;
generate, based on the one or more additional reporting elements, third processing artifacts; and
store the third processing artifacts for analysis.

16. The apparatus of claim 15, where the processor is further to:
analyze the flow of the item through the process further based on the third processing artifacts.

17. A non-transitory computer-readable medium storing instructions, the instructions comprising:
one or more instructions which, when executed by at least one processor, cause the at least one processor to:
generate instructions for a program, instructions for a first sub-program, and instructions for a second sub-program,
the program being to call the first sub-program based on an occurrence of a first service of a process of an item,
the program being to call the second sub-program based on an occurrence of a second service of the process of the item,
the program including code associated with a plurality of entry points and code associated with a plurality of exit points,
a first entry point, of the plurality of entry points, being associated with the first service,
a first exit point, of the plurality of exit points, being associated with the first service,
a second entry point, of the plurality of entry points, being associated with the second service,
a second exit point, of the plurality of exit points, being associated with the second service,
each of the plurality of entry points being different than each of the plurality of exit points,
apply, based on execution of the generated instructions for the program, execution of the generated instructions for the first sub-program, and execution of the generated instructions for the second sub-program, a plurality of reporting elements to the first service of the process,
a first reporting element, of the plurality of reporting elements, being applied at the first entry point, and
a second reporting element, of the plurality of reporting elements, being applied at the first exit point;
apply, based on execution of the generated instructions for the program, execution of the generated instructions for the first sub-program, and execution of the generated instructions for the second sub-program, a plurality of other reporting elements to the second service of the process,
the second service being heterogeneous from the first service,
a third reporting element, of the plurality of other reporting elements, being applied at the second entry point, and
a fourth reporting element, of the plurality of other reporting elements, being applied at the second exit point;
generate, based on the first reporting element, the second reporting element, the third reporting element, and the fourth reporting element, first processing artifacts and second processing artifacts,
the first processing artifacts and second processing artifacts each comprising:
a coordination identification that is substantially unique to the item,
a service identification that is substantially unique to a portion of the process to which the reporting element is applied, and
a time stamp; and
analyze a flow of the item through the process based on the first processing artifacts and the second processing artifacts by examining a representation of the flow of the item through the process,
the representation being based on a transformation of the first processing artifacts and the second processing artifacts to include a plurality of icons associated with the flow of the item through the process.

18. The non-transitory computer-readable medium of claim 17, further comprising:
one or more instructions to store the first processing artifacts with the second processing artifacts,
where, when analyzing the flow of the item, the processor is further to:
access the stored first processing artifacts and the second processing artifacts to analyze the flow.

19. The non-transitory computer-readable medium of claim 17, further comprising:
one or more instructions to store the first processing artifacts and the second processing in a log of processing artifacts,
where the one or more instructions to analyze the flow of the item include:
one or more instructions to use the log of processing artifacts to analyze the flow.

20. The non-transitory computer-readable medium of claim 17, where the representation is a sequence diagram illustrating the plurality of icons associated with the flow of the item through the process.

21. The non-transitory computer-readable medium of claim 17, further comprising:
one or more instructions to store the first processing artifacts and the second processing prior to analyzing the flow of the item.

22. The non-transitory computer-readable medium of claim 17, further comprising:
one or more instructions to analyze the flow of the item prior to storing the first processing artifacts and the second processing artifacts; and
one or more instructions to store the first processing artifacts and the second processing after analyzing the flow of the item.

23. The non-transitory computer-readable medium of claim 17, further comprising:
one or more instructions to generate instructions for a third sub-program;
one or more instructions to apply, based on execution of the generated instructions for the third sub-program, one or more additional reporting elements to a third service of the process;
one or more instructions to generate, based on the one or more additional reporting elements, third processing artifacts; and
one or more instructions to store the third processing artifacts for analysis.

24. The non-transitory computer-readable medium of claim 23, further comprising:
one or more instructions to analyze the flow of the item through the process further based on the third processing artifacts.

* * * * *